O. W. FOUST.
HARVESTER ATTACHMENT FOR ENGINES.
APPLICATION FILED MAR. 24, 1911.

1,023,011.
Patented Apr. 9, 1912.

Inventor
O. W. Foust.

Witnesses

By

Attorney

COLUMBIA PLANOGRAPH CO., WASHINGTON, D. C.

UNITED STATES PATENT OFFICE.

ORSON W. FOUST, OF COGSWELL, NORTH DAKOTA.

HARVESTER ATTACHMENT FOR ENGINES.

1,023,011.  Specification of Letters Patent.  Patented Apr. 9, 1912.

Application filed March 24, 1911. Serial No. 616,646.

*To all whom it may concern:*

Be it known that I, ORSON W. FOUST, a citizen of the United States, residing at Cogswell, in the county of Sargent and State of North Dakota, have invented certain new and useful Improvements in Harvester Attachments for Engines; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in harvester attachments for traction engines and the object in view is to produce a simple and efficient device of this nature which may be applied to various types of engines and so arranged as to be adjustable to regulate its height from the ground.

My invention is illustrated in the accompanying drawings, in which:—

Figure 1:
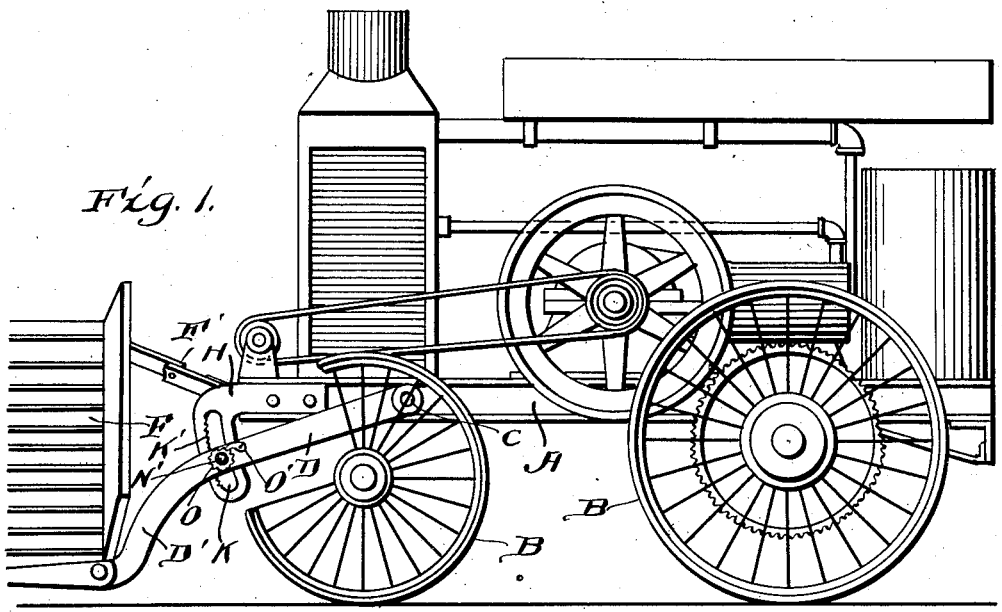
Figure 2:
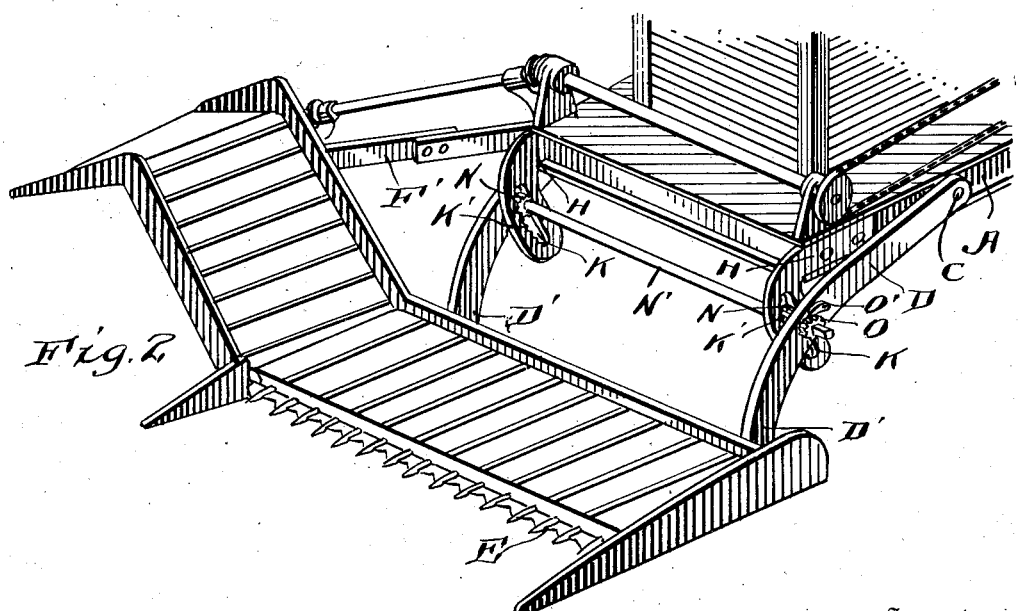

Figure 1 is a side elevation of an engine showing the application of my invention thereto, and Fig. 2 is an enlarged detail perspective view of the attachment.

Reference now being had to the details of the drawings by letter, A designates the side beam of an ordinary traction engine mounted upon the wheels B. Pivotally mounted upon opposite sides of the frame upon the pivot C are the bars D having their forward ends curved as at D' and to which the cutter bar E is adapted to be fastened.

F designates an elevator up which the grain being harvested is adapted to be raised, said elevator being held rigidly by a brace F' connecting the same to the frame of the engine.

Fastened to the opposite sides of the frame of the engine are the plates H, each having an elongated curved slot K formed therein upon one of the marginal edges K' of which is a series of gear teeth adapted to engage the teeth of the pinion wheel N fixed to the stub shaft N' which is journaled in an aperture in the bar D. A ratchet wheel O is also fixed to the stub shaft N' and a pivotal pawl O' mounted upon the bar is adapted to engage the teeth of the ratchet wheel to hold the same and the pinion from rotation in one direction. One end of the shaft N' is squared in order to receive a crank or other suitable means for rotating the same.

From the foregoing, it will be noted that, by the provision of a device as shown and described, a simple and efficient apparatus is afforded whereby a harvester may be attached in advance of the traction engine and so arranged that the cutter bar may be held to cut at different elevations, the engine serving to support or partially so the weight of the harvester and, by the provision of the attachment to the harvester, the engine may be also employed in the usual manner to haul gang or other plows attached to the rear thereof.

What I claim to be new is:—

A harvester attachment for traction engines comprising a pair of pivotally mounted curved bars, a cutter-bar carried by the ends of said bars, fixed plates arranged between said bars provided with depending portions having curved slots, one of the marginal edges of each slot being provided with teeth, a shaft mounted in said bars and extending through said slots having a crank receiving end portion, pinions fixed on said shaft within the slots of the plates meshing with the teeth thereof, a ratchet wheel carried by said shaft, and a pivoted pawl carried by one of said bars engaging said ratchet wheel.

In testimony whereof I hereunto affix my signature in the presence of two witnesses.

ORSON W. FOUST.

Witnesses:
H. E. SHEARN,
A. D. FLINN.

---

Copies of this patent may be obtained for five cents each, by addressing the "Commissioner of Patents, Washington, D. C."